UNITED STATES PATENT OFFICE 2,381,371

REACTION OF ACETONE WITH UNSATURATED COMPOUNDS

Olyn Wayne Shannon, Niagara Falls, N. Y., assignor to E. I. du Pont de Nemours & Company, Wilmington, Del., a corporation of Delaware No Drawing. Application May 3, 1943, Serial No. 485,492

4 Claims. (Cl. 260—464)

This invention relates to the reaction of acetone with unsaturated organic compounds, more particularly with acrylonitrile (vinyl cyanide), and to the new chemical compound thereby produced.

My invention is concerned with a new chemical compound, methyl γ-cyanopropyl ketone having the formula:

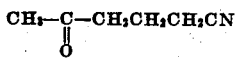

and to a method by which it may be readily prepared. This new chemical compound is valuable as an intermediate in the preparation of various organic chemical products such as resins and plasticizing agents.

In accordance with my invention acrylonitrile and acetone are reacted in the presence of an alkaline condensing agent whereby one β-cyanoethyl group is introduced in place of one of the hydrogen atoms on a carbon atom adjacent the carbonyl group. As alkaline condensing agent or catalyst I may employ any material which is alkaline in reaction such, for example, as alkali metal and alkaline earth metal oxides, hydroxides, carbonates, hydrides, alcoholates and cyanides. For most rapid reaction those alkaline materials which are less alkaline than sodium carbonate are to be avoided, but such alkaline condensing agents, as for example the alkyl amines, may be employed under more elevated temperature conditions or when rapidity of reaction is not a factor. The alkali metal hydroxides and cyanides, for example sodium hydroxide and sodium cyanide, are particularly effective and are my preferred catalysts. The alkaline condensing agent should be present in amounts ranging from 0.5% to 10% by weight based on the weight of the reaction mixture. When utilizing alkaline condensing agents such as the hydroxides and cyanides of the alkali metals the amount necessary need generally not exceed 3%.

In carrying out the reaction a mixture of the acetone and acrylonitrile may be prepared and the catalyst added thereto in small amounts, thereby initiating the reaction. As the reaction is exothermic in character it is generally not necessary to supply heat, except such initial heating as may be necessary to bring the reaction mixture to a suitable temperature within the range 0 to 100° C. at which the chemical reaction will be initiated. If substantial amounts of heat are evolved it may be necessary to provide cooling in order to dissipate the excess heat.

The reaction may be carried out in a solvent or diluent such as hexane, benzene, petroleum ether or ether. However, as a general rule, the use of a diluent is not recommended and the reaction is carried out in a reaction mixture constituted simply by the two chemical compounds involved. The order of addition of these reactants, or the stage of the process at which the alkaline condensing agent is added, are not important. Good results may be secured by adding the alkaline condensing agent to a mixture of the reagents, by adding one of the reactants to a mixture of the catalyst with the other reactant, or by adding both the acrylonitrile and acetone to a medium containing the catalyst. The catalyst or alkaline condensing agent may be added in small amounts or all at once, as desired, care being taken to provide some means for getting rid of the excess heat developed in those cases where the exothermic character of the reaction results in the development of considerable heat.

The best yields of the desired chemical compound, methyl-γ-cyanopropyl ketone, are obtained when, after completion of the reaction, the reaction mixture is neutralized with acid prior to being subjected to distillation or to some other treatment whereby the product may be isolated. Various conventional means for recovering the product of a reaction may be utilized, and while recovery by distillation is preferred other means of recovery, such as by extraction of the product with a suitable solvent, are feasible and may be utilized.

When carrying out the reaction in the liquid phase under the conditions described and at temperatures within the range 0 to 100° C. the duration of the reaction period generally varies from 1 to 5 hours. The time of reaction may be shortened somewhat by employing fairly large amounts of alkaline condensing agent and higher temperatures, i. e. temperatures approaching 100° C.

The reaction occurring may be represented by the following equation:

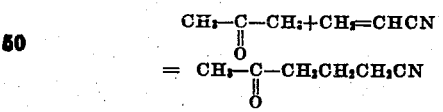

The following example is given as illustrative of this invention:

Example

To a mixture of 58 grams (1 mole) of acetone there was added 53 grams (1 mole) of acrylonitrile and 2 cubic centimeters of a 50% solution of sodium hydroxide. The reaction mixture was heated in a reaction flask under reflux conditions for 5 to 7 hours.

At the conclusion of the reaction the reaction mixture was allowed to stand overnight and then neutralized by the addition of hydrochloric acid. It was then distilled under a pressure slightly less than atmospheric in order to remove unreacted acetone and acrylonitrile.

The residue, a viscous yellowish liquid, was subjected to distillation under reduced pressure of 2 millimeters of mercury whereupon there was obtained 9.5 grams of a compound boiling within the range 100 to 130° C. (at 2 millimeters pressure). This product is methyl-γ-cyanopropyl ketone, $CH_3COCH_2CH_2CH_2CN$. The reaction flask also contained considerable amounts of a resinous material believed to be polymerized acrylonitrile.

Various changes may be made in the above procedure described as illustrative of my invention without departing from the scope thereof.

I claim:

1. A method for preparing methyl-γ-cyanopropyl ketone which comprises reacting acetone with acrylonitrile, in substantially equimolecular proportions, in the presence of an alkaline condensing agent at a temperature within the range 0 to 100° C.

2. A method for preparing methyl-γ-cyanopropyl ketone which comprises reacting acetone with acrylonitrile, in substantially equimolecular proportions, in the presence of an alkaline condensing agent and a diluent.

3. A method for preparing methyl-γ-cyanopropyl ketone which comprises reacting acetone with acrylonitrile, in substantially equimolecular proportions, at a temperature within the range 0 to 100° C. in the presence of sodium hydroxide as alkaline condensing agent.

4. A method for preparing methyl-γ-cyanopropyl ketone which comprises reacting acetone with acrylonitrile, in substantially equimolecular proportions, at a temperature within the range 0 to 100° C. in the presence of sodium cyanide as alkaline condensing agent.

OLYN WAYNE SHANNON.